United States Patent
Medard et al.

(10) Patent No.: US 6,507,012 B1
(45) Date of Patent: Jan. 14, 2003

(54) METHOD AND APPARATUS FOR DETECTING MALFUNCTIONS IN COMMUNICATION SYSTEMS

(75) Inventors: Muriel Medard, Champaign, IL (US); Stephen R. Chinn, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/845,702

(22) Filed: Apr. 30, 2001

Related U.S. Application Data

(62) Division of application No. 09/256,150, filed on Feb. 24, 1999.
(60) Provisional application No. 60/075,992, filed on Feb. 25, 1998.

(51) Int. Cl.[7] .................................................. H01J 40/14
(52) U.S. Cl. .................. 250/225; 356/73.1; 250/227.17
(58) Field of Search ............................ 250/227.11, 225, 250/227.17, 559.09; 359/349, 127, 128, 192, 110–117, 177; 356/73.1

(56) References Cited

U.S. PATENT DOCUMENTS

| | | | |
|---|---|---|---|
| 4,979,235 A | * 12/1990 | Rumbaugh et al. | ......... 359/192 |
| 5,444,238 A | 8/1995 | Ghererdi et al. | ........ 250/227.11 |
| 5,473,463 A | * 12/1995 | Van Deventer | ............. 359/192 |
| 5,703,682 A | 12/1997 | Eslambolchi | ............... 356/73.1 |
| 6,005,695 A | 12/1999 | Roberts | ........................ 359/110 |
| 6,023,358 A | 2/2000 | Baney | .......................... 359/110 |
| 6,064,501 A | 5/2000 | Roberts et al. | ............. 359/110 |
| 6,101,010 A | 8/2000 | Konishi | ....................... 359/110 |

* cited by examiner

*Primary Examiner*—Que T. Le
*Assistant Examiner*—Thanh X. Luu
(74) *Attorney, Agent, or Firm*—Daly, Crowley, & Mofford LLP

(57) ABSTRACT

Apparatus and techniques for detecting malfunctions, anomalies and attacks upon optical devices of a transparent all-optical network, including amplified links and optical nodes, of the network. A portion of an input signal of the optical device and a portion of an output signal from the optical device are coupled to an optical processing unit and a an optical to electrical signal converter. The electrical output signal of the converter is coupled to an electronic processing unit which generates a difference signal which is a function of the input and output signal portions for comparison to a predetermined set of parameters. The result of the comparison is an alarm signal indicative of the occurrence of a malfunction. Also described is an optical comparator capable of generating the difference signal which is indicative of perturbations in the optical device.

11 Claims, 10 Drawing Sheets

METHOD AND APPARATUS FOR DETECTING MALFUNCTIONS IN COMMUNICATION SYSTEMS

RELATED APPLICATIONS

This application is a divisional of and claims priority under 35 U.S.C. §120 from application no. 09/256,150 filed Feb. 24, 1999, which claims priority under 35 U.S.C. §119(e) from Provisional application no. 60/075,992 filed Feb. 25, 1998.

GOVERNMENT RIGHTS

This work was sponsored by the United States Air Force under Contract No. F19628-95-C-0002. The government has certain rights in this invention.

FIELD OF THE INVENTION

This invention relates generally to network management systems and more particularly to techniques for detecting malfunctions in communications networks.

BACKGROUND OF THE INVENTION

As is known in the art, an all-optical network (AON) refers to a network which utilizes exclusively lightwave communication. In particular, an AON system refers to a system in which: all network-to-network interfaces are based on optical transmission, all user-to-network interfaces use optical transmission on the network side of the interface, and all switching and routing within AON network nodes is performed optically. One important advantage of maintaining an optical network core in comparison to using electro-optic components at nodes or in transmission systems is higher bandwidth. Typically, optical bandwidths are generally one hundred fold those of electronic bandwidths. Thus, avoiding optical/electronic/optical conversions can provide in some instances roughly one hundred times greater data rates than possible with electro-optic networks.

An optical network that allows routing and switching of data within the network without interpretation or regeneration of the individual data streams is referred to as a transparent network or as a network having a transparency feature. Within this context of transparency, we do not include all-optical techniques for data regeneration. Such techniques may be faster than electro-optic regeneration methods, but may be modulation or format dependent and, hence non-transparent. While transparent networks have many desirable features (e.g. terminal upgrades do not require network upgrades), transparency has important ramifications for security.

Although contemporary AONs are still largely in the research arena, commercial providers are beginning to provide limited AON functions in their networks. Those AONs in the research arena may be generally classified into two types: wavelength division multiplexed (WDM), which separate multiple channels of traffic each onto its own wavelength, and time-division multiplexed (TDM), which separate multiple channels of traffic each into its own time slot. Code Division Multiple Access (CDMA) networks also exist. CDMA networks provide a multiple access scheme by using code sequences as traffic channels in a common optical channel. CDMA permits more than one signal to simultaneously utilize the channel bandwidth in a noninterfering manner. TDM networks to date have often employed soliton transmission and other features that will likely require further development to reach commercial maturity. Therefore, WDM AONs are more likely to be exploited in the near term than are TDM AONs.

Existing AONs are generally architected as circuit-switched networks. Circuit-switched networks are compatible with (1) existing telecommunication installations (long haul), (2) asynchronous transmission mode (ATM) networks, and (3) some multiplexing equipment often used with Internet networks. Fully operational packet-switched AONs have not been implemented, in part owing to the lack of a desirable optical memory.

AON architecture can generally be divided into optical terminals (which are the user-network interface), network nodes (which switch, route, and sometimes perform multiplexer/demultiplexer functions), and optically amplified fiber optic links. A separate control network (not always all-optical) is usually used for signaling purposes. The switching and routing may be done via mechanical switches, opto-electronic switches, passive optical routers, or splitter/combiners. Common network topologies include star, ring, and mesh. Some network architectures allow a hybrid mixture of network topologies.

Although there are a large number of possible architectures, most contemporary WDM AONs are built using a combination of a relatively small set of devices or components each of which has a security property. Some commonly used AON components are shown in Table 1.

TABLE 1

| Component | Component Function | Example |
| --- | --- | --- |
| Combiner | Combine optical signals from N fibers to 1 fiber | Star Coupler |
| Splitter | Split signal from 1 fiber to N fibers | Star Coupler |
| Demultiplexer | Separate multiple signals on one fiber each onto its own fiber | Waveguide Grating Router |
| Multiplexer | Combine individual signals from multiple fibers onto one fiber | Waveguide Grating Router |
| Optical Amplifier | Increases the signal strength (amplitude) of an input signal | Erbium Doped Fiber Amplifier (EDFA) |
| Spatial Switch | Let pass or dump particular signals, or switch it between fibers | $LiNbO_3$ Switch |
| Lasers | Transmit a signal | Many |
| Optical Receivers | Receive a signal | PINFET, Avalanche Photo-diodes |
| Fiber Cable | Transport | Many |

One component of relative importance in AONs, as well as in other networks including but not limited to electro-optic networks, is the optical amplifier. Optical amplifiers are used in both nodes and links of AONs. Some optical amplifiers work by using a pump laser and a gain medium to amplify optical signals without converting them to electronic signals. One artifact of the amplification is amplified spontaneous emission (ASE) noise, which is added to the output of a signal exiting the amplifier.

Each of the components listed in Table 1 above is susceptible to some form of malfunction. As used herein, the term "malfunction" refers to any abnormal operational change, including but not limited to a degradation. A malfunction may cause a failure at one or more links or nodes and may have various causes, such as a security attack. A malfunction may affect signal channels having signal paths or routes which share devices with a nefarious user's channel. An understanding of the security properties of each component provides a reasonable foundation for predicting network vulnerabilities and suggesting robust architectures.

The above components have been integrated into testbeds to show the operations and limitations of AONs. AON demonstrations to-date have taken place mostly in government-funded testbeds or testbeds funded by consortia. In the United States, there are consortia involving academia, industry, and government. In particular, the AON, MONET, and NTONC consortia have multiple participating organizations and have all developed testbeds. In addition, the European RACE consortium, and the Japanese efforts have also developed testbeds. Various testbeds and laboratory experiments have demonstrated aggregate throughputs of over 1 Tbit/s. The traffic carried has consisted of Asynchronous Transfer Mode (ATM), Internet Protocol (IP), Synchronous Optical Network (SONET), Frame Relay, and digitized video.

The components of AONs and other networks including non-AON networks are each vulnerable to some form of denial of service or eavesdropping-type attack. Some attack methods of concern include jamming (i.e. the overpowering of legitimate network signals with illegitimate or attack signals) which can be used to degrade or deny service, and the exploitation of device crosstalk. Device crosstalk exists within a number of different optical devices, and is the phenomenon in which signals from one portion of the optical device leak into another portion of the same device. The crosstalk phenomena can be used to implement service denial or eavesdropping attacks. It should be noted that signal interception and traffic analysis are both included under the eavesdropping heading as that term is used herein. It is thus desirable to detect malfunctions including attacks such as eavesdropping attacks in AON's and other networks but not limited to electro-optic networks.

There are may reasons for which, in AONs, malfunctions must be detected and identified at all points in the network where malfunctions may occur, and the speed of detection should be commensurate with the data transmission rate of the network. One reason why the high data rates of AONs have an important consequence for malfunction detection, is because large amounts of data can be affected in a short time. When a fixed duration malfunction disrupts service, the amount of data affected is linearly proportional to the data rate. Similarly, in an eavesdropping attack the amount of data compromised is linearly proportional to the data rate. The larger amounts of data (e.g. number of "bits in flight") on a particular fiber path for AONs versus electro-optic networks means more data is vulnerable to any particular malfunction than would be in a lower rate network.

For example, one conventional approach to checking for malfunctions in existing networks is to use data verification at the network perimeter. In this approach, the check on the data may be end-to-end decoding such as is done in some existing electronic networks (e.g. frame relay). Extending this technique to AONs, the check on the data may be accomplished by performing a power test on the received signal. In a tera-bit per second (Tbit/s) optical network, perimeter detection of malfunction combined with a total network path delay on the order of milliseconds will result in gigabits of data having been attacked. Moreover if the AON is transparent, it will not always be possible to place decoding and checking mechanisms at several locations throughout the AON to overcome the latency problem since transparent AONs do not currently include components for interpretation and regeneration at which such checking mechanisms would typically be arranged in the network.

High AON data rates are not the only reason why identification of malfunctions should take place at all possible malfunction locations. An incorrect diagnostic may be given by the network management system. For example, consider a system in which a first channel (e.g. channel 1) attacks a second channel (e.g. channel 2) via crosstalk in a switch (in-band jamming). In this case, the output of the switch can be a channel with excessive power that causes a gain competition attack on a third channel (e.g. channel 3) at an amplifier. If a monitoring device at the amplifier detects the attack of channel 2 on channel 3, but the switch does not detect the attack of channel 1 on channel 2, the network management system may decide to disconnect channel 2. Indeed, the only information available to the network management system is that channel 2 is nefarious at the amplifier, even though channel 1 is the offending channel.

Generally, there exist several techniques that might be used to perform malfunction detection in AONs: (1) wideband power detection, (2) optical spectral analysis (OSA), (3) pilot tones, and (4) optical time domain reflectometry (OTDR). Each of these techniques has strengths and weaknesses with respect to an individual network architecture and malfunction methods. Particular strengths include the detection of single-location overt jammers by pilot toners, power detectors, and OSAS, as well as the possibility of OTDRs to detect certain eavesdropping attacks. Limitations include the fact that power detection and OSA techniques are susceptible to sporadic malfunctions, and pilot tone and OTDR techniques do not protect against eavesdropping.

It would, therefore, be desirable to provide a technique to protect unmodified existing devices via a "wrapper" technique (i.e. a technique which "fits around" communication devices but does not require modification of the devices). It would also be desirable to provide a technique which does not require in-the-field retrofitting of nodes and links in networks including but not limited to AONs and electro-optic networks at great economic cost to make secure an inherently insecure infrastructure. It would also be desirable to provide a technique for dealing with: (1) sporadic jamming, which attempts to disrupt service but "disappears" before it can be detected; (2) multipoint malfunctions, which attempt to thwart service and to avoid detection methods that attempt to localize them (these malfunctions are potentially much more pernicious if the attackers are well synchronized); (3) control system and protocol malfunctions, which attempt to confuise the network controlling mechanisms into believing failures exist, usually to provoke reactions that negatively affect the network services; and (4) sporadic jamming combined with a protocol malfunction (which can become even more problematic if cleartext headers are exploitable by an attacker). It would further be desirable to provide a technique that works for transparent networks, and is capable of operation with very high-speed communications (e.g. commensurate with rates of several Gbps).

SUMMARY OF THE INVENTION

In view of the above problems and limitations associated with prior art techniques, it becomes apparent that transparent AONs do not afford a single integrity test on either the input or the output of any device within the network. Except for simple tests (e.g. total power), no one quantitative test can be used for malfunction detection since the legitimate signal could be modulated in very many ways. However, according to the invention, consideration of device input signals and output signals together yields malfunction detection, even for a transparent AON.

In accordance with the present invention, apparatus and techniques are described for providing a quantitative test to be used for operation monitoring and/or malfunction detection based on the concept that the input and output signals of a device have a mathematical relationship that is well known by the network management system that controls the service. In particular, malfunction detection is achieved by determining whether or not a function of the input and output signals conforms to an a priori known set of parameters.

In one embodiment, an apparatus for detecting malfunctions on an optical device, or element in a transparent all-optical network or an electro-optic network, includes (a) means for coupling a portion of an input signal of the optical device to an optical processing unit; (b) means for coupling a portion of an output signal from the optical device to the optical processing unit; and (c) means for comparing the portion of the input signal and the portion of the output signal to a predetermined set of parameters. Illustrative optical devices include operational nodes amplified links and the components listed in Table 1.

In accordance with a further aspect of the present invention, a method for detecting malfunctions on an optical device in a transparent all-optical network or an electro-optic network includes the steps of (a) coupling to an optical processing unit a portion of an input signal to the optical device; (b) coupling to the optical processing unit a portion of an output signal from the optical device; and (c) comparing the portion of the input signal and the portion of the output signal to a predetermined set of parameters.

With the above-described apparatus and techniques, detection defenses are provided against sporadic jammning, and against multipoint malfunctions assuming an algorithm running in a network management system integrates information from several devices or nodes in the network. Also, since it is not necessary to modify existing optical or AON devices, the described apparatus and techniques for implementing security measures are less expensive than field retrofitting of nodes, links, and other optical devices in AONs and electro-optic networks. Thus the present invention avoids the economic limitations encountered in the cost of retrofitting an inherently insecure infrastructure to make it more secure. Furthermore, the methods and apparatus proposed herein are relatively simple to implement, thereby further reducing costs below other apparatus and techniques which require changing existing AON devices.

The apparatus and techniques of the present invention provide a security "wrapper" which fits around communication devices but, as noted above, do not require modification of the devices. Wrappers can be placed or removed without changing the functionality of a device. Such an approach provides flexibility, ease of upgrade and applicability to different types of devices. Moreover, having a wrapper at a single device provides a determination that a malfunction occurred at a particular device. Such accurate pinpointing is useful for diagnostics which react to malfunctions. The detection methods are applicable to any modulation and encoding scheme and work without knowledge of which particular scheme is used and thus the techniques of the present invention work for transparent nodes. Further, the detection schemes described herein require relatively little processing and thus, are relatively rapid. The schemes therefore operate efficiently for very high-speed communications, such as on the order several Gbps.

In accordance with a still further aspect of the present invention, an optical comparator for comparing an input signal of an optical device with an output signal from the optical device includes: (a) a polarization controller having a first input port receiving a portion of the input signal and having an output port; (b) a second polarization controller having a first input port receiving a portion of the output signal and having an output port; and (c) an optical hybrid having a first input port coupled to the output port of the first polarization controller and a second input port coupled to the output port of the second polarization controller and having a plurality of output ports.

With this particular arrangement, an optical comparator is provided for detecting perturbations in an optical component by comparing the input and output signals of the device. In some applications, the detection of unwanted perturbations can correspond to those of a nefarious attacker in the optical component. In communication systems, it is desirable to detect malfunctions and sense such signal differences as rapidly as possible, at frequencies approaching the data rate, as is possible with the described optical comparator.

The optical comparator may further include a phase shifter coupled between the output port of the first polarization controller and the first input port of the optical hybrid. With this arrangement, the relative phase between the output signals from the two polarization controllers can be changed. The optical comparator may further include a plurality of optical to electrical signal converters, such as photodetectors, having input ports coupled to respective ones of the output ports of the optical hybrid and having output ports coupled to an optical phase controller which controls the phase of the phase shifter.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Before describing the circuits and processing to be performed by and on transmission networks, it should be appreciated that, in an effort to promote clarity, reference is sometimes made herein to "signals" or "information" being transmitted between "nodes" or "links" of a "network." Such reference should not be taken as being limited to transmission or operation on All Optical Networks (AONs). Rather, the present invention finds application in a wide variety of different network types including but not limited to electro-optic networks and networks having at least one optical component. Thus, the nodes or links may include electrical apparatus other than optical components, such as computer implemented switches, electromechanical switches, mechanical apparatus or any other apparatus appropriate to process the communication signals being provided to the node or link.

Figure 1:
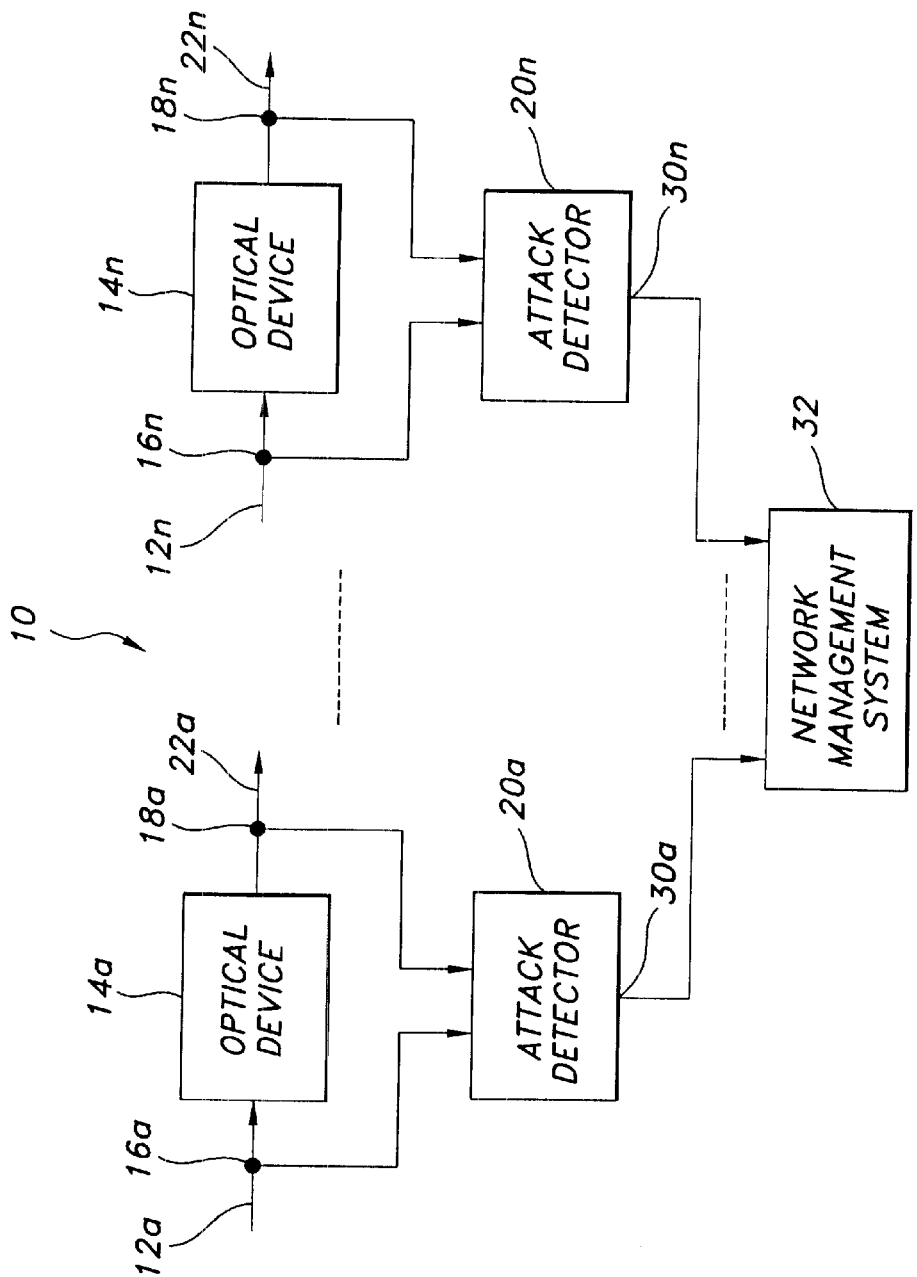
FIG. 1 is a block diagram of a malfunction detection system.

Referring to FIG. 1, a malfunction detection system 10 for an all-optical network (AON) includes a plurality of optical devices 14a–14n, each one receiving one or more input signals 12a –12n and providing one or more output signals 22a–22n, respectively. Illustrative optical devices (referred to alternatively herein as "devices to be observed") 14a–14n include an optical amplifier within a fiber link or node, a demultiplexer/switch/multiplexer within a node, or a star-combiner in a local-area network hub (or other combinations of devices from Table 1).

A malfunction detector 20a–20n is coupled to each of the optical devices 14a–14nfor detection of an attack on the respective device or for performing a monitoring operation. Each attack detector 20a–20n has a first input port coupled to a tap 16a–16n associated with the input signal 12a–12n of the respective device 14a–14n and a second input port coupled to a tap 18a–18n associated with the output signal 22a–22n of the respective device. In this manner, each malfunction detector 20a–20n receives a known negligible portion of the input signal 12a–12n and a known negligible portion of the output signal 22a–22n associated with the respective device 14a–14n.

An alarm signal indicative of the presence of a malfunction on the respective optical device 14a–14n is provided at an alarm port 30a–30n of each of the malfunction detectors 20a–20n, as shown. A network management system 32 which controls operation of the system 10 is responsive to one or more alarm signals provided at alarm ports 30a–30n for taking appropriate action to report and/or terminate a detected malfunction. The apparatus and techniques described herein are directed to the malfunction detectors 20a–20n and will be described with reference to an illustrative optical device 14 having one or more input signals 12, an input signal tap 16, one or more output signals 22, and an output signal tap 18.

Figure 1A:
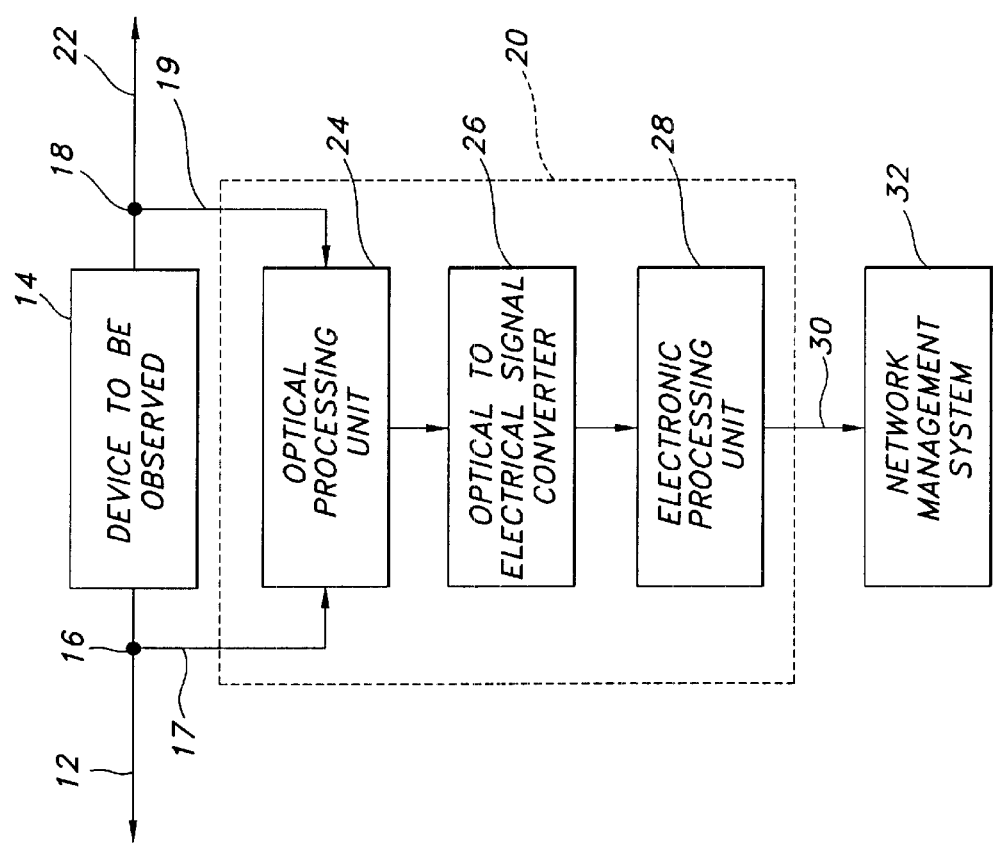
FIG. 1A is a more detailed block diagram of a portion of the system of FIG. 1.

Referring to FIG. 1A, in which like reference numbers refer to like elements of FIG. 1, a portion of the malfunction detection system 10 of FIG. 1, including illustrative optical device 14, malfunction detector 20, and network management system 32, is shown. The malfunction detector 20 includes an optical processing unit 24 having a first input port to which the portion 17 of the input signal 12 is coupled via tap 16 and a second input port to which the portion 19 of the output signal 22 is coupled via tap 18. Various optical processing of one or both of the signals 17, 19 may be performed by the unit 24, as described below in conjunction with the various embodiments of the invention.

An output port of the optical processing unit 24 is coupled to an input port of an optical to electrical signal converter 26, such as may be provided in the form of a photodetector. Converter 26 is operative to convert the optically processed versions of signals 17 and 19 into electrical signals for coupling to an electronic processing unit 28.

The electronic processing unit 28 generates a signal which is a function of the input and output signals 12 and 22, respectively, and is given by $f(r_1 \ldots r_2, s_1 \ldots s_2)$, where $r_1 \ldots r_2$ represent input signals 12 and $s_1 \ldots s_2$ represent output signals 22. The electronic processing unit 28 detects the presence of a malfunction by consideration of the function signal. The function signal provides a measure of the operation of the device 14with respect to a set of nominal parameters and comparison of the value of the function signal to the set of parameters determines whether or not the alarm signal provided at alarm port 30 is indicative of a malfunction. The alarm port 30 is adapted for connection to a network management system 32 which processes alarm signals from one or more observed network devices.

Use of the malfunction detector 20 of FIG. 1 does not require changing the observed device 14 in any way, but rather forms a "wrapper" around the device. The detector 20 further decouples (to some extent) the security protection afforded a device from the design and manufacturing of the device itself.

Figure 2:
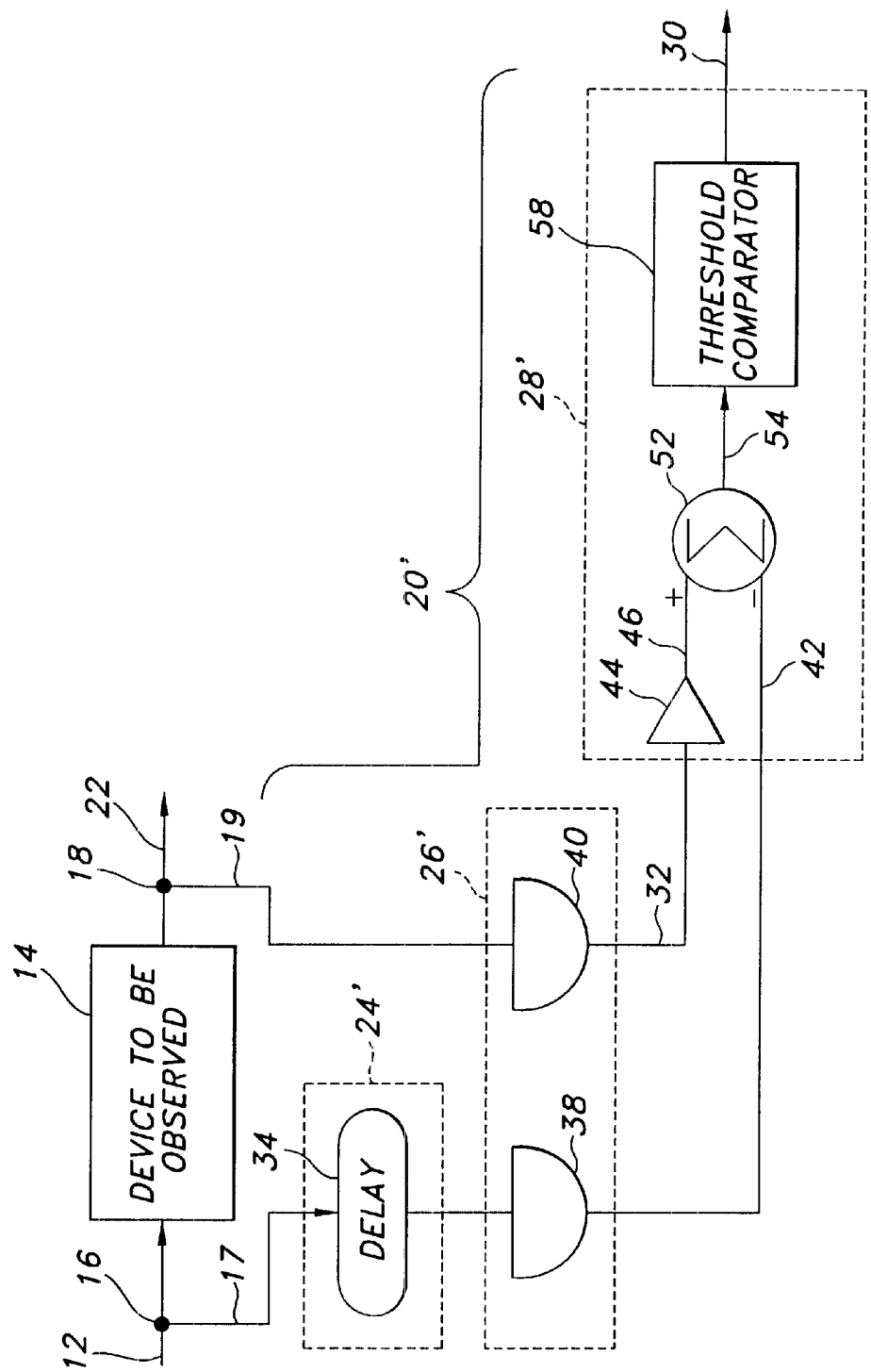
FIG. 2 is a block diagram of one embodiment of the malfunction detection system of FIG. 1A implementing amplitude comparison.

Referring now to FIG. 2, one embodiment 20' of the malfunction detector 20 of FIG. 1A is shown, with like reference numbers referring to like elements. The optical processing unit 24' includes a delay element 34 which adds a delay to the input signal 17 which is matched to the intrinsic delay of the device 14. The output signal from delay element 34 and the output signal portion 19 are coupled to an optical to electrical signal converter 26', such as may include photodetectors 38 and 40. The delay element output signal is converted into an electrical signal 42 by photodetector 38 and the output signal portion 19 is converted into an electrical signal 32 by photodetector 40.

The electrical signals 32, 42 provided by the signal converter 26' are coupled to an electronic processing unit 28', including an optional amplifier/attenuator 44, a summing circuit 52 and a threshold comparator 58, arranged as shown. The amplifier/attenuator 44 may be provided to reduce the gain of the signal 32 by the gain of the device 14. It will be appreciated by those of ordinary skill in the art that the amplifier/attenuator 44 could be optical (i.e., preceding the detector). The amplifier/attenuator 44 can be characterized as a gain/loss compensator for device 14 with a time-average gain/loss which is expected to be constant. While use of an optical amplifier tends to be relatively expensive, it is typically a faster device.

Photodetection is a square-law detection process. Thus, the difference between the two input signals 42, 46 to the summing circuit 52 (as represented by summing circuit difference output signal 54) is the difference in amplitude of the input and output signals 12 and 22 of the device.

The difference signal 54 is compared by a threshold comparator 58 to an estimate of what the difference in amplitude between the input and output signals 12, 22, respectively, should be under normal operation of the device 14. The result of this comparison is an alarm signal provided at the alarm port 30 which is indicative of an attacker's presence.

The detection scheme of FIG. 2 represents a short time scale approach (e.g. bit-by-bit) to determine whether an alarm should be generated at the alarm port 30 and is intrinsically different from a statistical test (e.g. power averaging). As an example, consider the output of the two photodetectors 38, 40, where the observed device 14 is an optical amplifier. Ignoring amplifier noise added during amplification, the input and output signals 12, 22 differ only by a multiplicative factor attributable to the amplifier gain. Therefore, assuming the delay element 34 is matched to the amplifier transmission path delay and the gain in the amplifier/attenuator 44 is set to the inverse of the gain of the observed device 14, the difference signal 54 should be zero under normal operation. If an attacker challenges the amplifier 14 with out-of-band jamming, the signals 42, 46 would become unbalanced causing the difference signal 54 to be non-zero and the threshold associated with the threshold comparator 58 to be exceeded, generating an alarm indication at port 30.

Significantly, the malfunction detection scheme of FIG. 2 does not depend upon the data rate or modulation format of the data passing through the observed device 14, but requires only careful matching of the path delays to ensure comparison of the same section of signal. The exact A requirements for matching are dependent upon the traffic flowing through the transparent network. For digital on-off keying, for example, delay matching to a fraction of a bit period is required. In general, the path delays need to be matched to the highest data rate.

While the malfunction detection scheme of FIG. 2 guards against malfunctions that affect the amplitude of a signal, it provides no information about the phase. Thus, for certain types of modulations, such as phase shift keying, this method would be unable to detect phase only malfunctions. This scheme will also not guard against the possibility that the attacker has direct physical access to the monitor ports (i.e., this scheme presumes that all nodes are repeater/regenerator locations and security wrappers are enclosed within their own secure enclaves). The analysis does not require that the long haul installed fiber plant be secured, nor does it require that each terminal location be within a secure enclave. The scheme will effectively guard against attacks sourced from the long haul fiber plant, outside secured nodes.

Figure 3:
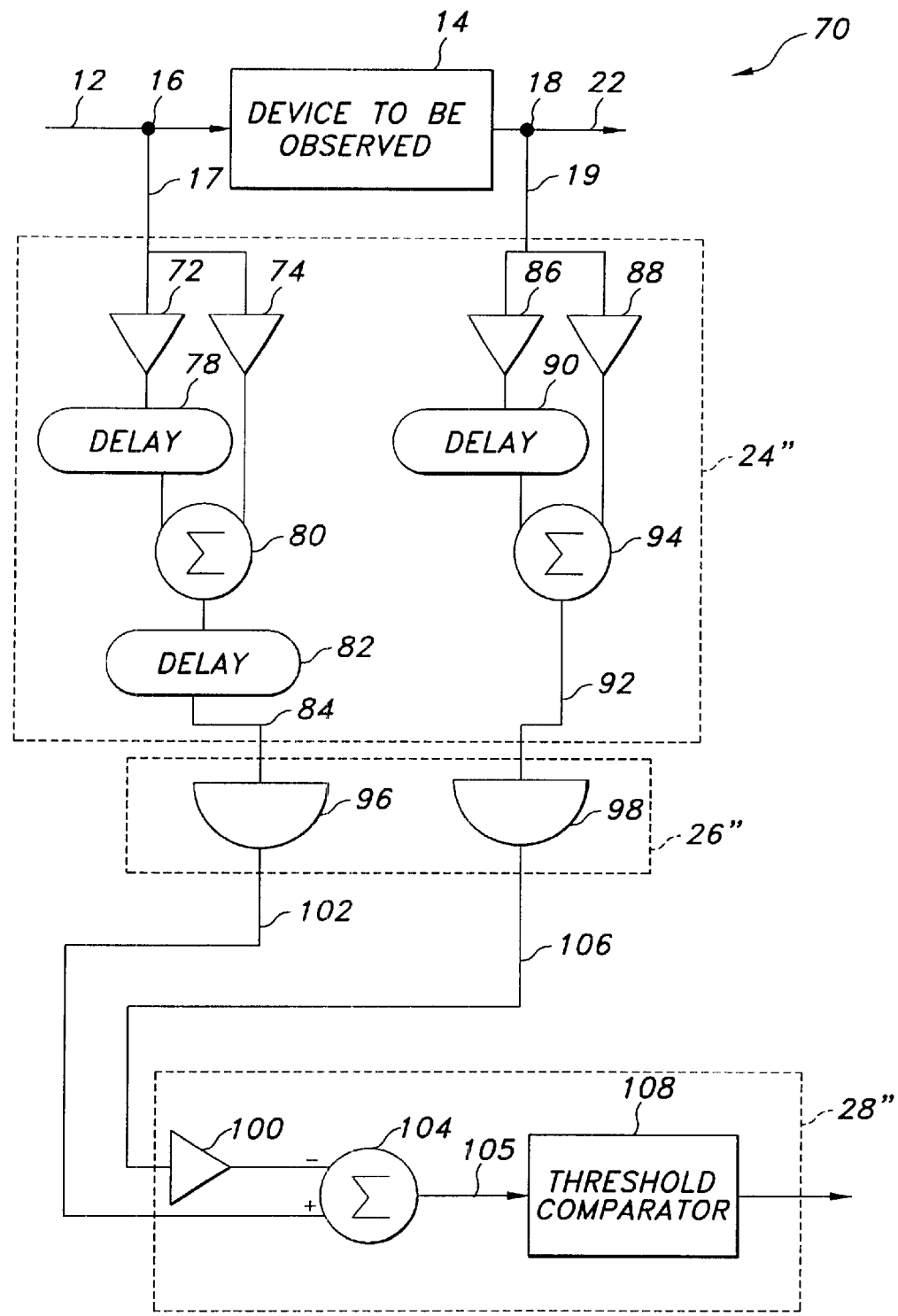
FIG. 3 is a block diagram of another embodiment of the malfunction detection system of FIG. 1A implementing phase and amplitude comparison.

Referring now to FIG. 3, another embodiment 70 of the malfunction detector 20 of FIG. 1A is shown, in which like reference numbers refer to like elements. In contrast to the technique described above in conjunction with FIG. 2, in the circuit of FIG. 3, the tapped signals 17, 19 are optically processed to produce a sample correlation of the input and output signals 12, 22 using an optical delay-and-sum operation.

More particularly, each of the tapped signals 17, 19 is coupled to a respective pair of amplifier/attenuators 72, 74 and 86, 88, as shown. The output signal from one amplifier/attenuator 72, 86 of each amplifier pair is delayed by a respective delay element 78, 90 and coupled to a first input of a summing circuit 80, 94. The output signal from the other amplifier/attenuator 74, 88 of each amplifier/attenuator pair is coupled directly to a second input of the respective summing circuit 80, 94. The amplifier/attenuators 72, 74, 86, and 88 balance the signals pairwise, and among pairs.

The output signal 84 from the delay element 92 and the output signal 92 from the summing circuit 94 are coupled to an optical to electrical signal converter 26", such as may include individual converters, or photodetectors 96 and 98, as shown. The converter output signals 102, 106 are coupled to an electronic processing unit 28.

The electronic processing unit 28" includes an optional amplifier 100 for reducing the gain of the output signal 106 of photodetector 98 by the gain of the device 14, a summing circuit 104, and a threshold comparator 108. Summing circuit 104 generates a difference signal 105 equal to the difference in amplitude and phase of the input and output signals 12, 22, respectively. The threshold comparator 108 compares the amplitude difference to a first predetermined threshold and/or the phase difference to a second predetermined threshold in order to determine whether a malfunction should be indicated by the alarm signal provided at alarm port 30.

The advantage of the embodiment of FIG. 3 over that of FIG. 2 is that malfunctions that affect amplitude and/or phase will be detected, although certain combined phase and amplitude malfunctions will not be detected. This is because detection is based on changes in signal correlations, which depend on amplitude and phase in a non-separable manner. Stated differently, phase and amplitude effects are not decoupled. However, the amplitude and phase comparator 108 is generally more complex than the amplitude comparator 58 of FIG. 2.

The detection time associated with the method of FIG. 3 is dependent upon the optical signal power received at the photodetectors 96, 98 and the thresholds used for the comparison by comparator 108. It is not dependent upon the number of bits or symbols received. Because of the dependence upon optical power, there is a tradeoff among the signal-to-noise ratio (SNR) of the signals on the fiber (and the loss in the observed device), the detection time, and the degree of certitude desired to assert a malfunction is underway.

The likelihood that an alarm condition indicated by the alarm signal when no malfunction is present is referred to as a false positive and the likelihood that a malfunction eludes the detection mechanism while successfully attacking the network is referred to as a false negative. False positives and false negatives are metrics that are interwoven by a single threshold selected in the comparator 108 in the electronic processing unit 28. More particularly, the threshold relates to the detected difference signal, whose meaning depends on the pre-differencing configuration. Both false positive and false negative results are dependent upon the SNR, the detection time allowed, the noise levels in the observed device. For a single tone in-band jammer (coherent crosstalk) having the same relative power as the communication signals themselves, false positive and false negative values can be achieved on the order of the bit error rate of the communication signal.

An obvious and conventional means of determining malfunctions upon a digital communication link is to monitor bit error rate (BER), and generate an alarm when the number of bit errors in a specified interval exceeds a threshold value. For example, in a SONET link with an approximate $10^{-9}$ bit error rate, and assuming a 1 Gbit/s communication link with 20 dB SNR, one means of deciding that a malfunction is underway is to set a BER threshold at a value higher than the nominal, for this example $10^{-9}$ is chosen. For this assumption, detection of the malfunction would require times on the order of hundreds of milliseconds to seconds depending upon the confidence required. In contrast, the scheme shown in FIG. 3 requires on the order of hundreds of nanoseconds to microseconds for the same detection probability, an improvement of about six orders of magnitude. This method may be useful in detecting a lost quality of service even during sporadic malfunctions.

Figure 4:
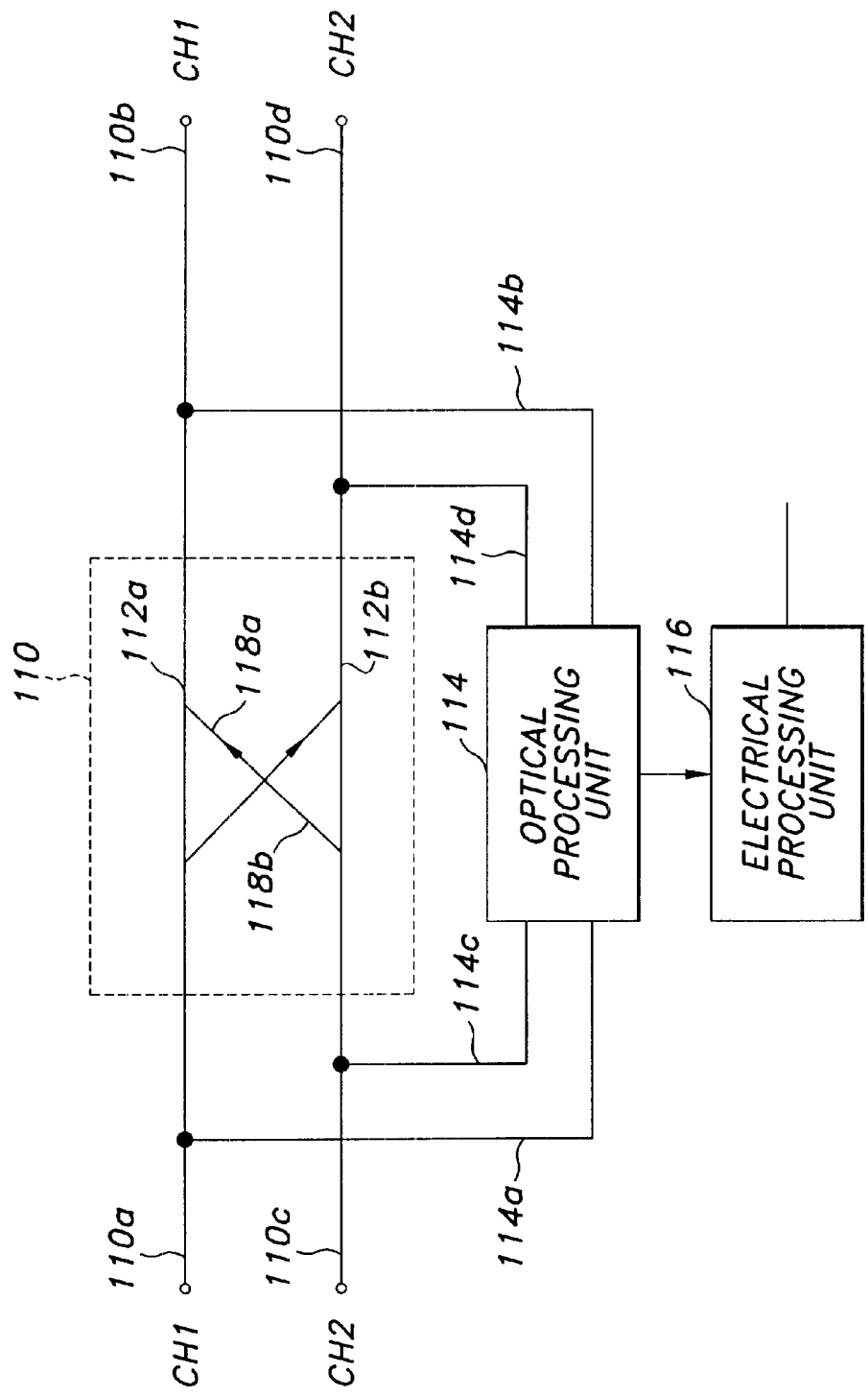
FIG. 4 is a block diagram of an eavesdropper detection system.

Referring now to FIG. 4, a circuit for detecting an eavesdropper listening to a channel of a device, such as a switch 110, is shown. Eavesdropping refers to the act of a third party (an "eavesdropper") detecting or listening without legitimate access to a signal transmitted from a first party to a second party. Eavesdropping is generally secret. The eavesdropper achieves such signal detection by coupling portions of the transmitted signal without the approval and usually the knowledge of either the sender or the intended recipient. The switch 110 includes switch ports 110a–110d, with a first switch channel 112a provided between switch ports 110a and 110b and a second switch channel 112b provided between switch ports 110c and 110d. The switch 110 has a finite amount of isolation between the first and second switch channels 112a, 112b. Owing to the finite isolation characteristics of the switch 110, a portion of a signal propagating along the first A switch channel 112a can be coupled to the second switch channel 112b through a so-called "leakage" or "crosstalk" signal path or channel 118a. Thus, a crosstalk signal propagates from the first switch channel 112a through the crosstalk channel 118a to the second switch channel 112b.

Similarly, a portion of a signal propagating along the second switch channel 112b can be coupled to the first switch channel 112a through a "leakage" or "crosstalk" signal path or channel 118b. Thus, a crosstalk signal propagates from the second switch channel 112b through the crosstalk channel 118b to the first switch channel 112a.

An optical processing unit 114 receives portions of input and output signals from channel 112a of the switch 110 via signal paths 114a, 114b. The input and output signal portions are subtracted via electrical processing unit 116 and any remaining signal corresponds to a crosstalk signal from channel 112b propagating on channel 112a. Similarly, the optical processing unit 114 receives portions of input and output signals from channel 112b of the switch 110 via signal paths 114c, 114d. The input and output signal portions are subtracted via the electrical processing unit 116 and any remaining signal corresponds to a crosstalk signal from channel 1 12a propagating on channel 112b.

If an eavesdropper on channel 112a wished to listen to signals on channel 112b, the eavesdropper transmits a signal on channel 112a having a signal amplitude substantially equal to or less than the crosstalk signal from channel 112b propagating on channel 112a. Since the two signal amplitudes are of comparable size or the crosstalk signal from channel 112b has an amplitude greater than the amplitude of the signal transmitted directly on channel 112a, the user on channel 112a can detect the crosstalk signal from channel 112b. That is, the eavesdropping portion is extra; the detector is in effect detecting the eavesdropping portion of the signal. In this manner it is possible to detect eavesdroppers on either of channels 112a, 112b. Thus, the above technique can be used to detect such eavesdropping due to the finite isolation characteristics between channels in optical components.

Figure 5:
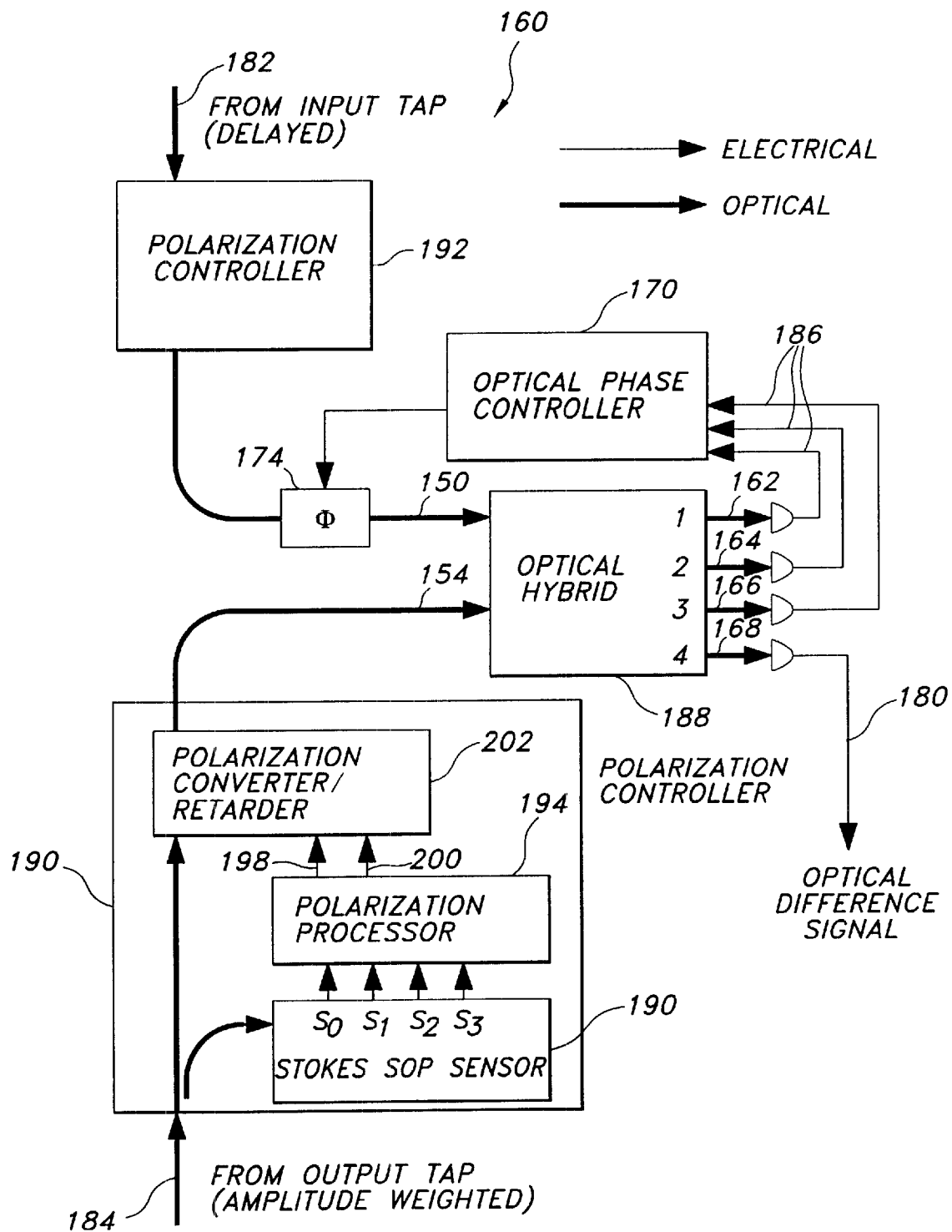
FIG. 5 is a block diagram of an optical comparator suitable for use with the detection systems described herein.

Referring now to FIG. 5, detection of unwanted perturbations (like nefarious attacks) in an optical component or device can be sensed by comparing the output and input signals of the device as discussed in the embodiments above. The optical comparator is a (vector) comparator of the optical fields, differencing from the intensity comparators using optical-to-electrical converters, prior to comparison. In communications systems it is desirable to detect malfunctions and sense such signal differences as rapidly as possible, at frequencies approaching the data rate. In optical systems, this usually involves sensing the difference in the suitably delayed and weighted optical intensities measured by an optoelectronic device such as a photodiode. The drawbacks to this conventional method are (1) the electronic subtraction process may slow the measurement, and (2) intensity difference detection cannot sense phase-varying malfunctions on constant-intensity modulation formats (e.g. DPSK).

The most general and powerful form of difference detection is to subtract the optical fields directly, and then measure the intensity of this difference field by optoelectronic detection. This subtraction process is phase sensitive, and the difference occurs instantaneously in the optical domain. Because this method requires vector subtraction of the two optical inputs to the comparator, difficulties are caused by the need to maintain a steady phase relationship and equal polarization states in the input fields. These difficulties are overcome by the optical comparator of FIG. 5.

FIG. 5 illustrates an optical comparator 160 using planar optical waveguide technology to provide optical sum, difference, and quadrature fields for maintaining a stabilized difference output. To this end, the optical comparator 160 includes a 90° optical hybrid 158 made from a monolithic multi-mode interferometric coupler. The optical hybrid 158 is described in the following papers: Quadrature outputs from fiber interferometer with 4×4 coupler, by T. Niemeier et al., Opt. Lett. 11, pp 667–679, 1986 and Ultracompact, all-passive optical 90°-hybrid on InP using self-imaging, by E. C. M. Pennings et al., IEEE Photon. Technol. Lett. 5, pp. 701–703, 1993, both of which are incorporated herein by reference.

In the optical hybrid 158, two single-mode waveguides 150, 154 carrying the optical input and output signals enter a wide, multimode region 158 terminated with four single-mode output waveguides 162, 164, 166 and 168. To a first approximation, the multi-mode region 158 is $nW^2/\lambda$ long, where n is the effective index of refraction of the planar guided mode, W is the width of the multimode region, and $\lambda$ is the free-space wavelength of the optical fields.

With $\pi/4$ phase shift introduced between equal-intensity input fields, the output intensities from waveguides 162–168 are $\cos^2(\phi/2)$, $2[1-\sin(\phi)]$, $2[1+\sin(\phi)]$, and $\sin^2(\phi/2)$, respectively, where $\phi$=optical phase difference between inputs. With $\phi$=0, the waveguide 168 provides the difference intensity. Waveguide 162 provides a sum intensity (which can be used for normalization purposes) and waveguides 164 and 166 provide feedback control to maintain $\phi$=0. If the input intensities are not equal, offset components are added to all the detected signals, but the difference between the detected quadrature signals still provides a phase-controlling feedback signal 186 proportional to $\rho \cdot \sin(\phi)$, where $\rho$ is the amplitude ratio.

For example, in a silica waveguide system, these detected outputs can control the electrical input to a small heating element in proximity to a waveguide, to thermally alter the phase of light traveling through the guide. With a small enough heating element, the response of such a feedback loop should be adequate to track slow environmental changes in relative phase. In the nulled state ($\phi$=0), the difference output signal 180 has an intensity proportional to $(1-\rho)^2$, which can be used to sense malfunctions that perturb the amplitude. Perturbation of the amplitude is equivalent to a change in $\rho$. For rapid phase malfunctions, a difference signal proportional to $4\rho \cdot \sin^2(\delta\phi/2)$ can be used to detect phase perturbations outside the bandwidth of the slow phase-tracking loop.

As noted above, proper operation of the optical comparator 160 requires that both input electric fields have the same state of polarization (SOP). Design of the hybrid is easier if this state is either TE (linear, in plane) or TM (linear, perpendicular). Since uncontrollable environmental factors will likely cause changes in the SOP of both inputs to the hybrid, these SOPs must be controllable. This requires the ability to sense the SOP of an input, and then to transform it to the desired state.

One technique for measuring the SOP without the use of variable retarders and polarizers, is to measure the Stokes polarization parameters with a Stokes SOP sensor 190, normally used for display of the SOP on the Poincare' sphere. $S_1$ gives the difference between horizontal and vertical linear polarization powers, $S_2$ gives the difference between +45° and −45° linear polarization powers, and $S_3$ gives the difference between right- and left-hand circular polarization powers (these are usually normalized by the total power, $S_0$). By using waveguide splitters, polarization selectors, and waveplate retarders these Stokes components can be measured directly using fixed waveguide components and photodiode detection, as described in the following papers: *Integrated Optic Adiabatic Devices on Silicon,* by Y. Shari et al., IEEE Jour. Quantum Electron. 27, pp. 556–566, 1991 and *Elimination of Polarization Sensitivity in Silica-Based Wavelength Division Multiplexer Using a Polymide Half Waveplate,* by Y. Inoue et al., Jour. Lightwave Technol. 15, pp. 1947–1957, 1997, both of which are incorporated herein by reference. External processing of the signals can be used for normalization, automatic gain control, etc. Having obtained parameters describing the SOP from a sampled portion of the field, we must also have the means of altering the SOP of the field entering the hybrid.

One means of doing this in a planar waveguide component has been described by Heismann and Alferness in a paper entitled *Wavelength-Tunable Electrooptic Polarization Conversion in Birefringent waveguides,* IEEE Jour. Quantum Electron. 24, pp. 83–93, 1988, which is incorporated herein by reference using a $LiNbO_3$ TE⇌TM converter/retarder 202. Using only two control voltages 198, 200, any input SOP can be converted to any output SOP. The feedback loop can be closed using an external processor 194 to convert the Stokes parameters to the control voltages necessary to obtain the desired TE or TM SOP at the respective hybrid input 150, 154. This feedback would be applied to both inputs tapped off the optical device being probed. Thus, polarization controller 192 is identical to polarization controller 196. Drifts in the SOP are expected to be much slower than the feedback loop response (primarily limited by the external signal processing, whether digital or analog).

In order for the optical subtraction process of the hybrid 158 to work, the two interfering signals must be phase coherent. Since the two signals in this case have a common source (one of them passing through the device under test), this means that interference can occur if the optical path lengths to the comparator are matched to less than a coherence length of the signals. Another more intuitive way of understanding this requirement is as follows. For signals whose spectral width is determined by the data rate [fast modulation rates (e.g. 10 Gb/s) that exceed a typical source linewidth (e.g. 20 MHZ)], the optical path delays must be matched to less than a bit interval. At 10 Gb/s, a one-bit path difference in optical fiber is 2 cm, so the path lengths must be matched to about 1 mm. Careful adjustment of fiber lengths is required, but an adjustable air-gap or fiber stretcher can provide fine tuning. Also, for high data rates and long devices (such as some erbium doped fiber amplifiers ( EDFAs)) or long return tap lengths, it may be necessary to match the optical path dispersions as well. This latter constraint is less severe, since the communication system itself generally requires the tested device to have low enough dispersion so that significant pulse spreading through it does not occur. The path matching or coherence length restriction also means that practical optical comparison will be limited to one WDM data channel (one wavelength) at a time.

Figure 6:
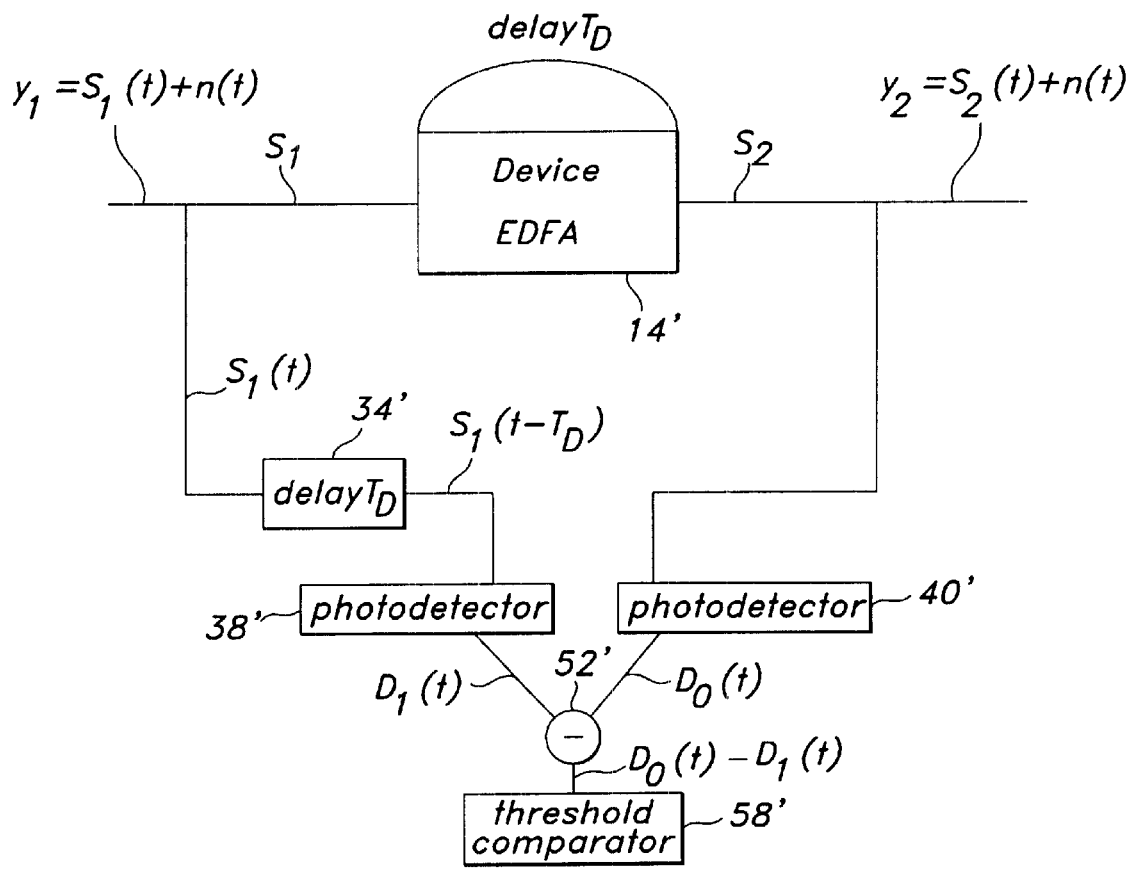
FIG. 6 is a block diagram illustrating operation of a malfunction detection system of the type shown in FIG. 2.

Referring now to FIG. 6, a malfunction detection system coupled to an erbium doped fiber amplifier (EDFA) can detect the presence of an undesired signal in an input signal $s_1$ at a time t (denoted as $s_1(t)$). The EDFA provides an output signal $s_2$ and the delay associated with traversing the EDFA is denoted as $T_D$. It should be noted that the below analysis assumes that there are no delays except for those explicitly indicated. The technique of the present invention determines the existence of a malfunction by sampling the input and output signals $s_1$, $s_2$ and detecting amplitudes of samples.

To determine sensitivity (i.e., the smallest attacking signal level which can be detected), it is first necessary to determine the false positive (FP) and false negative (FN) probabilities associated with the malfunction detection system. The FP probability is the probability that, given that no malfunction occurs, the system generates an alarm signal. The FN probability is the probability that, given that a malfunction occurs, the system does not generate an alarm signal.

It is assumed that in addition to the input signal $S_1$, noise is also fed to the input of the EDFA. In this particular example, the noise is assumed to be naturally occurring background complex all white Gaussian noise (AWGN) which is expressed as n(t). The variance of the real (or imaginary) component of the noise is denoted:

$$\sigma^2_N. \quad (1)$$

It should be noted that it is the noise variance, rather than the noise power spectrum $N_0$ being considered. The noise variance and the noise power spectrum are related by equation (2) below:

$$\sigma^2_N = W \frac{N_0}{2} \quad (2)$$

in which:

W is the bandwidth over which occurs transmission and detection of signals $s_1$, $s_2$; and $N_0$ is the noise power spectrum The output of the square law detectors is denoted as $D_1$ and $D_2$ and the difference between the signals $D_1$ and $D_2$ may be expressed as:

$$D_2(t) - D_1(t) = y_1 + y_2 - |s_1(t - T_D)|^2 \quad (3)$$

where $$y_1 = (Re(s_1(t-T_D)) + Re(n(t-T_D)))^2 \quad (4)$$

$Re(S_1(t-T_D))$ corresponds to the real component of the input signal $s_1$ at time $t-T_D$.

$Re(n(t-T_D))$ corresponds to the real component of the noise signal n at time $t-T_D$.

and $$y_2 = (Im(s_1(t-T_D)) + Im(n(t-T_D)))^2. \quad (5)$$

$Im(S_1(t-T_D))$ corresponds to the imaginary component of the input signal $s_1$ at time $t-T_D$.

$Im(n(t-T_D))$ corresponds to the imaginary component of the noise signal n at time $t-T_D$.

Considering first the false probability value, and assuming that a time delayed version of the input signal $s_1(t-T_D)$ is known, the distribution of a random variable $Y_1$, associated with the sample value $y_1$ can be found using conventional techniques. The characteristic function of $Y_1$ may be denoted as $\Phi_{Y_1}$ and techniques well-known to those of ordinary skill in the art, such as that described by A. Papoulis in "Probability, Random Variables and Stochastic Processes," McGraw-Hill International Editions, Electrical Engineering Series, 1984 may be used to write:

$$\Phi_{Y_1}(\omega) = \frac{1}{\sigma_N \sqrt{2\pi}} \int_{-\infty}^{+\infty} e^{j\omega(n-s')^2} e^{\frac{-n^2}{2\sigma_N^2}} dn. \quad (6)$$

in which:

$$n' = Re(n(t-T_D)) \quad (7)$$

and $$s' = Re(s_1(t-T_D)). \quad (8)$$

N' is a zero-mean Gaussian random variable with variance $\sigma^2_N$ and n' is a sample value that N' takes.

Likewise, the distribution of a random variable $Y_2$, associated with the sample value $y_2$ can be found using conventional techniques, the characteristic function of $Y_2$ may be denoted as $\Phi_{Y_2}$ and techniques well-known to those of ordinary skill in the art, such as those mentioned above may be used to write an expression for $\Phi_{Y_2}$. Then using conventional change of variable, substitution and other well known mathematical techniques, expressions for the probability density functions (pdf) of Y1 and Y2 may be found and the probability of the sum of Y1 and Y2 being greater than some value A may be expressed as:

$$P(Y_1 + Y_2) = 1 - \int_{z_1=0}^{\sqrt{A}} \frac{1}{\sigma_N \sqrt{2\pi}} \left( e^{\frac{-(z_2-s')^2}{2\sigma_N^2}} + e^{\frac{-(z_1-s')^2}{2\sigma_N^2}} \right) \quad (9)$$

$$\int_{z_2=0}^{z_1} \frac{1}{2\sigma_N \sqrt{2\pi}} \left( e^{\frac{-(z_2-s'')^2}{2\sigma_N^2}} + e^{\frac{-(z_2-s'')^2}{2\sigma_N^2}} \right) dz_2 dz_1$$

Note that we may simplify the above expression $$\frac{1}{2}\Phi\left(\frac{\sqrt{A}-s'-s''}{2\sigma_N^2}\right) + \frac{1}{2}\Phi\left(\frac{\sqrt{A}-s'+s''}{2\sigma_N^2}\right) + \quad (10)$$

$$\frac{1}{2}\Phi\left(\frac{\sqrt{A}-s'-s''}{2\sigma_N^2}\right) + \frac{1}{2}\Phi\left(\frac{\sqrt{A}-s'+s''}{2\sigma_N^2}\right)$$

Considering the threshold value as g, the probability of PN can be found from (10) by setting $$A = g + |s_1(t-T_D)|^2.$$

Considering next the false negative probability (FN), a threshold signal level g and a complex additive signal a can be assumed and used to define the output signal $y_3$ as:

$$y_3 = (Re(s_1(t-T_D)) + Re(n(t-T_D)) + Re(a(t-T_D)))^2 \quad (11)$$

$$y_4 = (Im(s_1(t-T_D)) + Im(n(t-T_D)) + Im(a(t-T_D)))^2 \quad (12)$$

The quantities Y3 and Y4 can be defined as the random variables associated with the sample values $y_3$ and $y_4$ respectively. The false negative probability conditioned on s and a is $P(Y_3+Y_4 \leq A^1)$, which can be found from (9) by subtracting the quantity given by the left hand side of equation (9) from 1 and replacing A by $A^1 = g + |s_1(t-T_D)|^2$.

Figure 7:
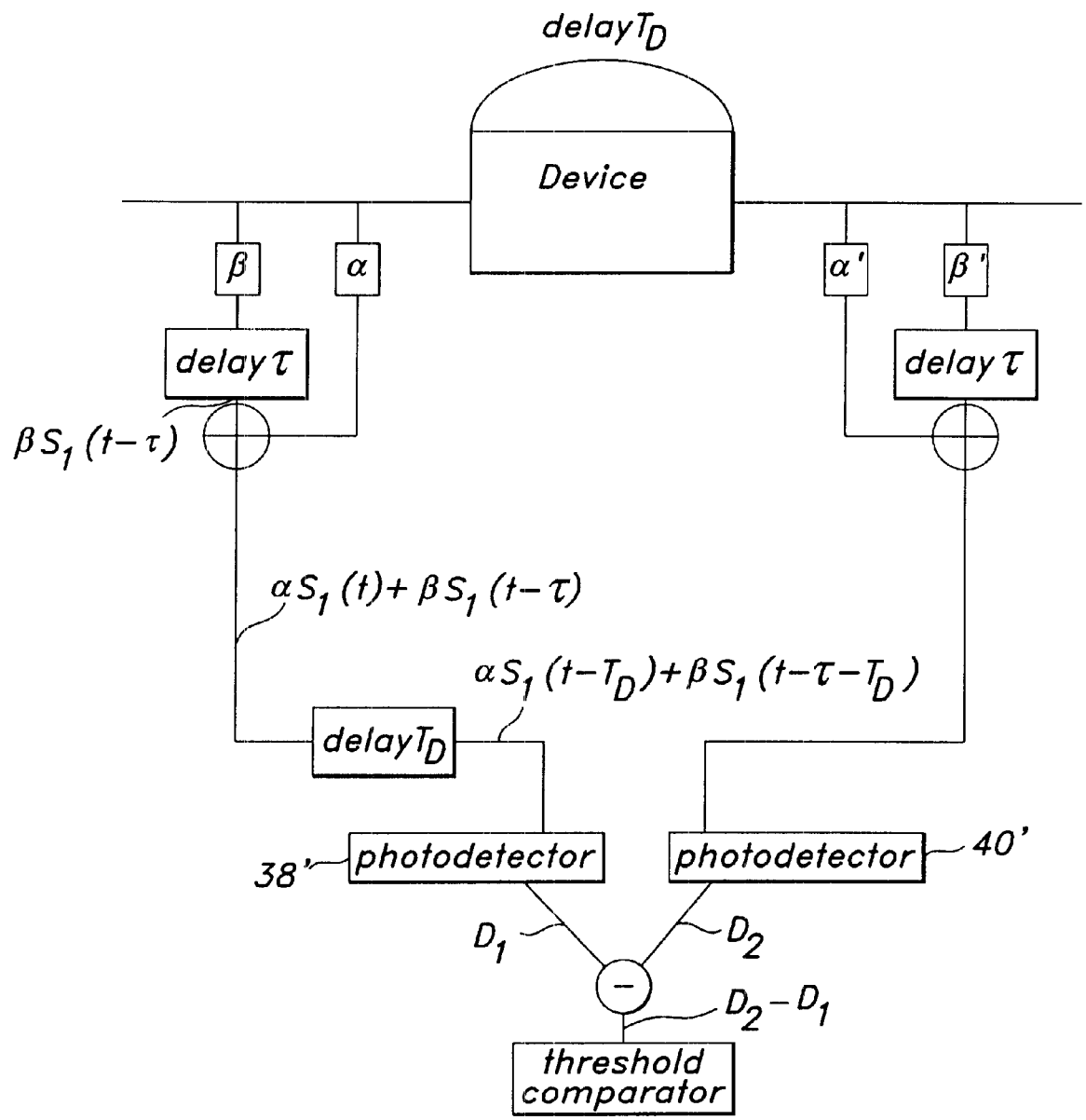
FIG. 7 is a block diagram illustrating operation of a malfunction detection system of the type shown in FIG. 3.

Referring now to FIG. 7, the operation of a malfunction detector of the type shown in FIG. 3 is illustrated. To take into account the phase in a modulation, a more extensive test must be performed. If the phase were maintained as the signal $s_1$ traverses the device which we seek to protect, then we could perform correlation between $s_1(t-T_D)$ and $s_2(t)$. In general in optical devices the phase is not maintained but, for a delay τ much smaller than the coherence time $\tau_c$ of the bandwidth we are considering, the difference in phase between $s_1(t-T_D)$ and $s_1(t-T_D-\tau)$ is the same difference in phase between $s_2(t)$ and $s_2(t-\tau)$. Therefore, a DPSK modulation could be possible.

Therefore, a malfunction which changes phase but not amplitude will be detected. For instance, DPSK modulation could be disrupted by change in the phase differences between samples and such a change would be detected by this method.

As shown in FIG. 7, two taps, separated by a delay τ, are used instead of the single tap of the first method. The tapped delay line on the LHS of the diagram combines $s_1(t)$ and $s_1(t-\tau)$, weighted them by α and β, respectively. Note that the first method is a special case where α=0 and β=1. The combination of these signals is then delayed by $T_D$ and square-law detected. Let us denote by $|s_1(t-T_D)$ and by $\phi_1(t-T_D)|$ the amplitude and phase, respectively, of $s_1(t-T_D)$.

The output of the squue-law detector is $$D_1(t) = |\alpha s_1(t-T_D) + \beta s_1(t-T_D-\tau)|^2 \quad (13)$$

$$= \alpha^2 |s_1(t-T_D)|^2 + \beta^2 |s_1(t-T_D-\tau)|^2 +$$

$$2\alpha\beta |s_1(t-T_D)||s_1(t-T_D -$$

$$\tau)|\cos(\phi_1(t-T_D))\cos(\phi_1(t-T_D-\tau)).$$

It should be noted that the right hand side of equation (13) depends solely on the amplitudes $|\alpha s_1(t-T_D)|$ and $|\alpha s_1(t-T_D-\tau)|$ and the difference value computed as $\phi_1(t-TD) - \phi_1(t-T_D-\tau)$.

In the right hand side of the malfunction detection circuit, there is a square-law detection of $\alpha' s_2(t) + \beta' s_2(t-\tau)$. Similarly to (13), the output is $$D_2(t) = \alpha'^2 |s_2(t)|^2 + \beta'^2 |s_2(t-\tau)|^2 + 2\alpha'\beta'|s_2(t)||s_2(t-\tau)|\cos(\phi_2(t)-\phi_2(t-\tau)) \quad (14)$$

Below, for simplicity of exposition, it is assumed that $\alpha'=\beta'=\alpha=\beta=1$, unless otherwise noted.

A comparison can be performed between $D_1$ and $D_2$ at the comparator.

$$D_2(t) - D_1(t) = y_1 + y_2 - |s_1(t-T_D) + s_1(t-T_D-\tau)|^2 \quad (15)$$

where $$y_1 = (Re(s_1(t-T_D)) + Re(n(t-T_D)) + Re(s_1(t-T_D-\tau)) + Re(n(t-T_D-\tau)))^2 \quad (16)$$

and $$y_2 = (Im(s_1(t-T_D)) + Im(n(t-T_D)) + Im(s_1(t-T_D-\tau)) + Im(n(t-T_D-\tau)))^2 \quad (17)$$

Let us look first at false positive probability (FP). Let us condition on $s_1(t-TD)$ and $s_1(t-TD-\tau)$ being known. Let us find the distribution of $Y_1$, the random variable associated with the sample value $y_1$. We shall proceed by establishing the characteristic function of the r.v. $Y_1$. We define $$n' = Re(n(t-T_D)) + Re(n(t-T_D-\tau)) \quad (18)$$

and $$s' = Re(s_1(t-T_D)) + Re(s_1(t-T_D-\tau)). \quad (19)$$

Note that N', the r.v. corresponding to the sample value n', is the sum of two IID zero-mean Gaussian r.v.s. each with variance $\sigma^2_N$ and is therefore a zero-mean Gaussian r.v. with variance $2\sigma^2_N$.

Let us denote the characteristic function of $Y_1$ by $\Phi_{Y_1}$. As for (6), we may use the method of A. Papoulis in "Probability, Random Variables and Stochastic Processes," McGraw-Hill International Editions, Electrical Engineering Series, 1984, pages 119–120 to write that $$\Phi_{Y_1}(\omega) = \frac{1}{2\sigma_N\sqrt{\pi}}\int_{-\infty}^{+\infty} e^{j\omega(n-s')^2} e^{\frac{-n^2}{4\sigma_N^2}} dn. \quad (20)$$

We may establish that the p.d.f of $Y_1$ is $$p_{Y_1}(y) = \begin{cases} \frac{1}{4\sigma_N\sqrt{\pi}}\left(e^{\frac{-(\sqrt{y}-s')^2}{4\sigma_N^2}} + e^{\frac{-(\sqrt{y}-s')^2}{4\sigma_N^2}}\right)\frac{1}{\sqrt{y}} & \text{if } y \geq 0 \\ 0 & \text{otherwise} \end{cases} \quad (21)$$

otherwise and the p.d.f of $Y_2$ is $$p_{Y_2}(y) = \begin{cases} \frac{1}{4\sigma_N\sqrt{\pi}}\left(e^{\frac{-(\sqrt{y}-s'')^2}{4\sigma_N^2}} + e^{\frac{-(\sqrt{y}-s'')^2}{4\sigma_N^2}}\right)\frac{1}{\sqrt{y}} & \text{if } y \geq 0 \\ 0 & \text{otherwise} \end{cases} \quad (22)$$

otherwise where $$s''=Im(s_1(t-T_D))+Im(s_1(t-T_D-\tau)). \quad (23)$$

In a manner similar to (9), we have that $$P(Y_1+Y_2 \geq A) = 1 - \int_{z_1=0}^{\sqrt{A}} \frac{1}{2\sigma_N\sqrt{\pi}}\left(e^{\frac{-(z_1-s')^2}{4\sigma_N^2}} + e^{\frac{-(z_1-s')^2}{4\sigma_N^2}}\right) \quad (24)$$

$$\int_{z_1=0}^{z_1} \frac{1}{2\sigma_N\sqrt{\pi}}\left(e^{\frac{-(z_2-s'')^2}{4\sigma_N^2}} + e^{\frac{-(z_1-s'')^2}{4\sigma_N^2}}\right)dz_2 dz_1$$

As in the previous section, we can use our interpretation in terms of Gaussian r.v.s conditioned on being positive to obtain:

$$\frac{1}{2}\Phi\left(\frac{\sqrt{A}-s'-s''}{\sigma_N^2}\right) + \frac{1}{2}\Phi\left(\frac{\sqrt{A}-s'-s''}{\sigma_N^2}\right) + \quad (25)$$

$$\frac{1}{2}\Phi\left(\frac{\sqrt{A}-s'-s''}{\sigma_N^2}\right) + \frac{1}{2}\Phi\left(\frac{\sqrt{A}-s'-s''}{\sigma_N^2}\right)$$

If we consider g to be the threshold, the probability of PN can be found from (25) by taking $A=g+|s_1(t-T_D)+s_1(t-T_D-\tau)|^2$.

To determine the false negative probability (FN), we assume that we have a threshold g and that there is a complex additive signal $\alpha$. We define $$y_3=(Re(s_1(t-T_D))+Re(n(t-T_D))+Re(\alpha(t-T_D))+Re(s_1(t-T_D-\tau))+ \\ Re(n(t-T_D-\tau))+Re(\alpha(t-T_D-\tau)))^2 \quad (26)$$

$$y_4=(Im(s_1(t-T_D))+Im(n(t-T_D))+Im(\alpha(t-T_D))+Im(s_1(t-T_D-\tau))+ \\ Im(n(t-T_D-\tau))+Im(\alpha(t-T_D-\tau)))^2 \quad (27)$$

and $Y_3$ and $Y_4$ to be the associated r.v.s. The FN probability conditioned on s and $\alpha$ is $P(Y_3+Y_4 \leq A^1)$, which can be found from (24) by taking 1-(LHS of equation (24) and replacing A by $A^1=g+|s_1(t-T_D)+s_1(t-T_D-\tau)|^2$.

Figure 8:
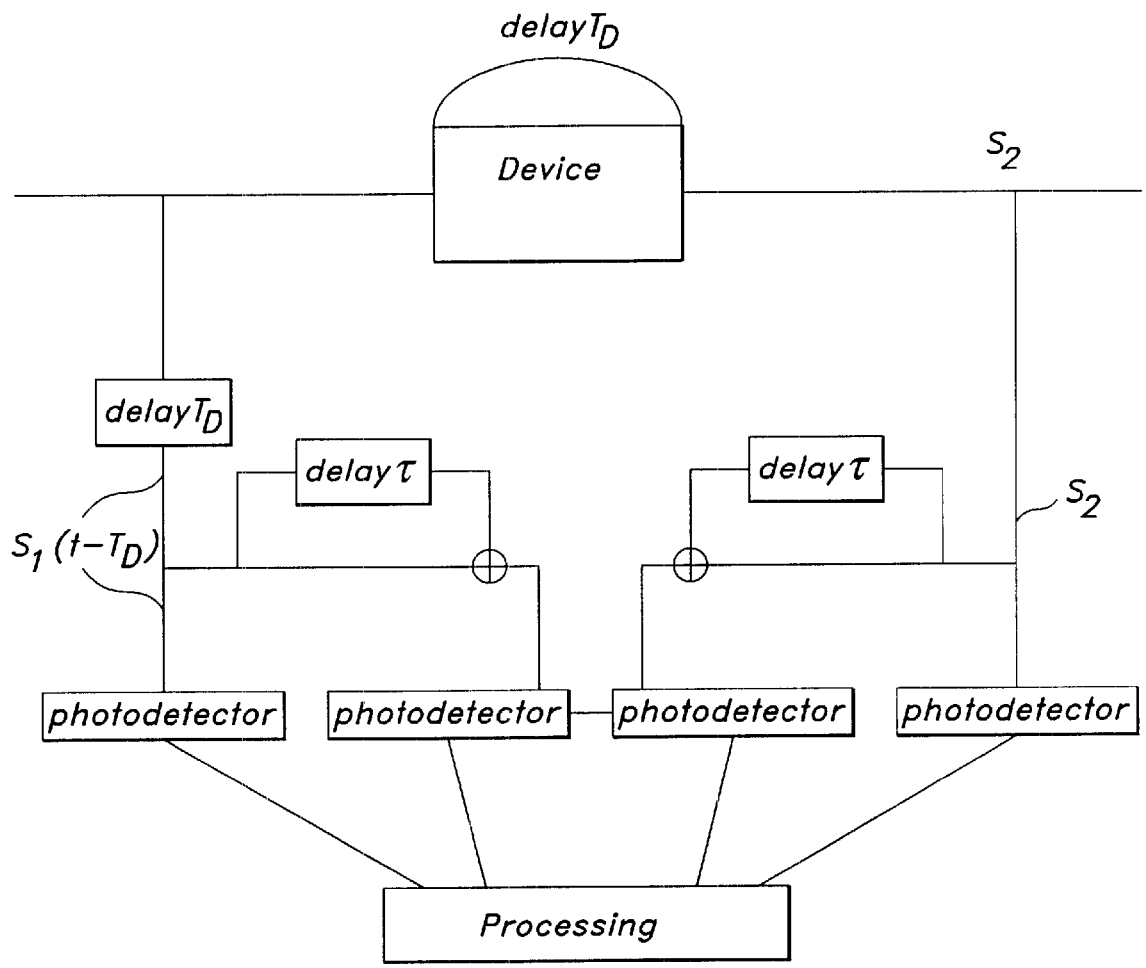
FIG. 8 is a block diagram of an alternate malfunction detection system.

Referring now to FIG. 8, to afford better protection for certain types of devices, such as EDFAs, which may present the added complication of ASE, an extension of the method pictured in FIG. 7 may be considered. The extension consists of adding extra detectors as shown in FIG. 8.

We detect the amplitude malfunction using the square-law detectors for $s_1$ and $s_2$, respectively. A malfunction on phase difference would be detected by the square-law detector on $s_1(t)$ and on $s_2(t)$. Note that we do not need separate detectors for $s_1(t-\tau)$ and $s_2(t-\tau)$, but simply need to main the measurements done at times t and t-$\tau$. In this case, a malfunction on amplitude would be detected by comparing $|s_1(t-\tau)|^2$ to $|s_1(t)|^2$ and by comparing $|s_2(t-\tau)|^2$ to $|s_2(t)|^2$. If no malfunction on amplitude has occurred, then a malfunction on phase difference may be detected through observing $\alpha's_2(t-T_D)+\beta's_2(t-T_D-\tau)$ and comparing it to $\alpha's_1(t-T_D)+\beta's_1(t-T_D-\tau)$. For simplicity of exposition, we shall assume in the following that $\alpha$, $\beta$, $\alpha'$ and $\beta'$ are all equal to 1.

The input of the device we seek to protect may be written as $$s_1(t)=|s_1(t)|e^{j\phi^1(t)} \quad (28)$$

The output of the device may be written as $$s_2(t)=|s_2(t)|e^{j\phi^2(t)} \quad (29)$$

We have the following outputs at time t from detectors 1, 2, 3, 4, respectively $$D_1(t) = |s_1(t-T_D)+s_1(t-T_D-\tau)|^2 \quad (30)$$

$$= |s_1(t-T_D)|^2+|s_1(t-T_D-\tau)|^2+$$

$$2|s_1(t-T_D)||s_1(t-T_D-\tau)|\cos(\phi_1(t-T_D)-\phi_1(t-T_D-\tau))$$

$$D_2(t)=|s_1(t-T_D)|^2 \quad (31)$$

$$D_3(t) = |s_2(t)+s_2(t-\tau)|^2 \quad (32)$$

$$= |s_2(t)|^2+|s_2(t-\tau)|^2+$$

$$2|s_2(t)||s_2(t-\tau)|\cos(\phi_2(t)-\phi_2(t-\tau))$$

$$D_4(t)=|s_2(t)|^2. \quad (33)$$

The corruption in squared amplitude at time t may be expressed as the ratio:

$$\frac{D_4(t)}{D_2(t)} \quad (34)$$

The corruption in phase between times t and t-$\tau$ may be determined by $$\cos(\phi_2(t)-\phi_2(t-\tau))-\cos(\phi_1(t-T_D)-\phi_1(t-T_D-\tau)) = \quad (35)$$

$$\frac{(D_3(t)-D_4(t)-D_4(t-\tau))}{\sqrt{D_4(t)D_4(t-\tau)}} - \frac{(D_1(t)-D_2(t)-D_2(t-\tau))}{\sqrt{D_2(t)D_2(t-\tau)}}$$

which gives the difference in the cosine of the phase difference at the input of the device and at the output of the device. Note that an attack which does not change the amplitude and which changes the sign of the phase, i.e., for which $$\phi_2(t)-\phi_2(t-\tau) = \phi_1(t-T_D)-\phi_1(t-T_D-\tau) \quad (36)$$

would not be detected by our scheme. the scheme given in the next subsection remedies this shortcoming.

Figure 9:
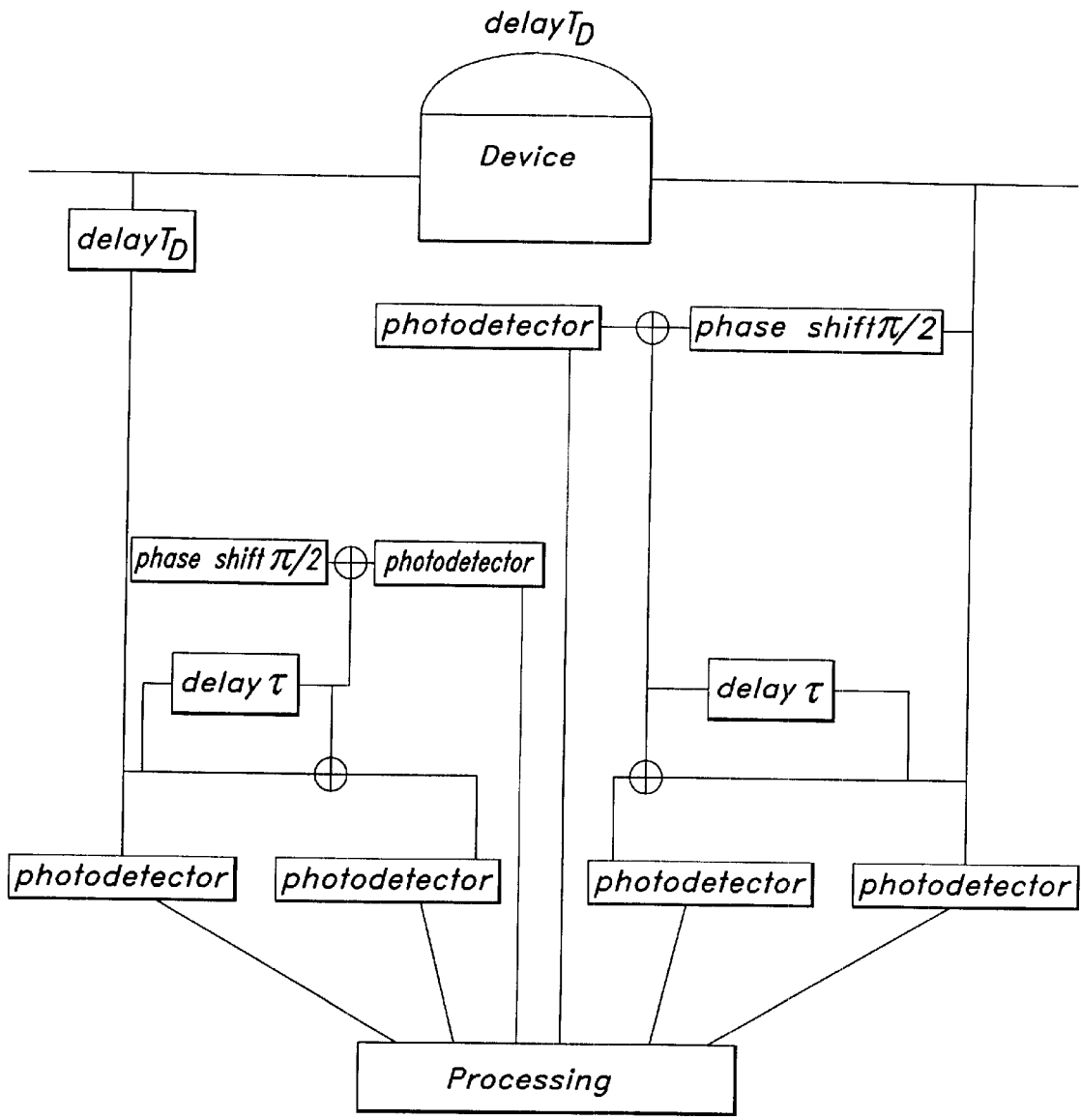
FIG. 9 is a block diagram of a further alternate malfunction detection system.

Referring now to FIG. 9, to obtain a better characterization of the malfunction, the techniques described above may be extended. FIG. 9 shows the method used.

There are two additional detectors, whose outputs are $$D_5(t) = \left| s_1(t-T_D) + s_1(t-T_D-\tau)e^{j\frac{\tau}{2}} \right|^2 \quad (37)$$

$$= |s_1(t-T_D)|^2 + |s_1(t-T_D-\tau)|^2 +$$

$$2|s_1(t-T_D)||s_1(t-T_D-\tau)|\sin(\phi_1(t-T_D)-\phi_1(t-T_D-\tau))$$

and $$D_6(t) = \left| s_2(t-T_D) + s_2(t-T_D-\tau)e^{j\frac{\tau}{2}} \right|^2 \quad (38)$$

$$= |s_2(t-T_D)|^2 + |s_2(t-T_D-\tau)|^2 +$$

$$2|s_2(t)||s_2(t-\tau)|\sin\phi_2((t)-\phi_2(t-\tau))$$

The corruption in phase between time t and t−τ may be fully determined by (35) and by $$\sin(\phi_2(t)-\phi_2(t-\tau))-\cos(\phi_1(t-T_D)-\phi_1(t-T_D-\tau)) = \quad (39)$$

$$\frac{(D_6(t)-D_4(t)-D_4(t-\tau))}{\sqrt{D_4(t)D_4(t-\tau)}} - \frac{(D_5(t)-D_2(t)-D_2(t-\tau))}{\sqrt{D_2(t)D_2(t-\tau)}}$$

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims. All publications referred to herein are hereby incorporated herein by reference in their entirety.

What is claimed is:

1. An optical comparator for comparing an input signal of an optical device with an output signal from the optical device, comprising:

(a) a first polarization controller having an input port receiving a portion of the input signal and having an output port;

(b) a second polarization controller having an input port receiving a portion of the output signal and having an output port; and (c) an optical hybrid having a first input port coupled to the output port of said first polarization controller, a second input port coupled to the output port of said second polarization controller, and a plurality of output ports.

2. The optical comparator of claim 1 further comprising a phase shifter coupled between the output port of said first polarization controller and the first input port of said optical hybrid.

3. The optical comparator of claim 2 further comprising:

(a) a plurality of optical to electrical signal converters having input ports coupled to respective ones of the output ports of said optical hybrid and having output ports; and (b) an optical phase controller having input ports coupled to the output ports of said signal converters and having an output port coupled to an input port of said phase shifter.

4. The optical comparator of claim 3 further comprising a difference signal converter having an input port coupled to an output port of said optical hybrid and having an output port at which an optical difference signal is provided.

5. The optical comparator of claim 4 further comprising a network management system for receiving the optical difference signal.

6. The optical comparator of claim 1 wherein each of said first and second polarization controllers comprises:

(a) an SOP sensor;

(b) a polarization processor coupled to said SOP sensor; and (c) a polarization converter/retarder.

7. The optical compurgator of claim 1 wherein said optical hybrid comprises a ninety degree optical hybrid.

8. The optical comparator of claim 1 wherein said optical hybrid includes a multi-mode region having a length approximately equal to $nW^2/\lambda$, wherein n is the effective index of refraction of a planar guided mode, W is the width of the multi-mode region and $\lambda$ is the free-space wavelength of optical fields.

9. The optical comparator of claim 6 wherein said polarization converter/retarder comprises a $LiNbO_3$ TE⇌TM converter/retarder.

10. The optical comparator of claim 1 wherein each input path to said optical hybrid has approximately equal path lengths.

11. The optical comparator of claim 1 wherein each input path to said optical hybrid has approximately equal path dispersions.

* * * * *

UNITED STATES PATENT AND TRADEMARK OFFICE
CERTIFICATE OF CORRECTION

PATENT NO. : 6,507,012 B1
DATED : January 14, 2003
INVENTOR(S) : Muriel Medard et al.

It is certified that error appears in the above-identified patent and that said Letters Patent is hereby corrected as shown below:

Title page,
Item [57], ABSTRACT,
Line 7, delete "a an" and replace with -- an --.

Column 5,
Line 61, delete "on the order several" and replace with -- on the order of several --.

Column 8,
Line 3, delete "14with" and replace with -- 14 with --.

Column 9,
Line 10, delete "exact A" and replace with -- exact --.

Column 11,
Line 4, delete "first A" and replace with -- first --.
Line 28, delete "1 12a" and replace with -- 112a --.

Column 13,
Line 56, delete "(EDFAs))" and replace with -- "(EDFAs) --.

Column 14,
Line 38, delete "spectrum" and replace with -- spectrum. --.
Line 48, delete "(Re(S$_1$" and replace with -- Re(s$_1$ --.

Column 16,
Line 22, delete "squue-law" and replace wth -- square-law --.
Line 39, delete "(t - τ) (14)" and replace with -- (t - τ)). (14)" --.

Column 17,
Lines 18 and 26, delete "(t - τ) (14)" and replace with -- (t - τ)). (14)" --.
Line 38, delete "dz$_2$dz$_1$" and replace with -- dz$_2$dz$_1$. --.
Line 67, delete "(24)" and replace with -- (24)) --.

UNITED STATES PATENT AND TRADEMARK OFFICE
CERTIFICATE OF CORRECTION

PATENT NO. : 6,507,012 B1
DATED : January 14, 2003
INVENTOR(S) : Muriel Medard et al.

It is certified that error appears in the above-identified patent and that said Letters Patent is hereby corrected as shown below:

Column 18,
Line 22, "$j\phi^1(t)$" and replace with -- $j\phi_1(t)$. --.
Line 25, "$j\phi^2(t)$" and replace with -- $j\phi_2(t)$. --.
Line 36, delete "$D_2(t)=s_1$" and replace with -- $D_2(t)=|s_1$. --.

Column 20,
Line 39, delete "compurgator" and replace with -- comparator --.

Signed and Sealed this

Twenty-ninth Day of July, 2003

JAMES E. ROGAN
*Director of the United States Patent and Trademark Office*